United States Patent
Kolodziej et al.

(10) Patent No.: US 10,812,118 B2
(45) Date of Patent: Oct. 20, 2020

(54) METHODS AND APPARATUS FOR PHOTONIC-ENABLED RADIO-FREQUENCY (RF) CANCELLATION

(71) Applicant: Massachusetts Institute of Technology, Cambridge, MA (US)

(72) Inventors: Kenneth E. Kolodziej, Lexington, MA (US); Bradley Perry, Nashua, NH (US); Siva Yegnanarayanan, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 167 days.

(21) Appl. No.: 16/193,060

(22) Filed: Nov. 16, 2018

(65) Prior Publication Data
US 2019/0173503 A1    Jun. 6, 2019

Related U.S. Application Data

(60) Provisional application No. 62/594,348, filed on Dec. 4, 2017.

(51) Int. Cl.
*H04B 1/10* (2006.01)
*H04B 10/40* (2013.01)
*H04B 1/525* (2015.01)

(52) U.S. Cl.
CPC .............. *H04B 1/10* (2013.01); *H04B 1/525* (2013.01); *H04B 10/40* (2013.01)

(58) Field of Classification Search
CPC ........... H04B 1/10; H04B 1/525; H04B 10/40
See application file for complete search history.

(56) References Cited

U.S. PATENT DOCUMENTS

| | | | | |
|---|---|---|---|---|
| 6,014,412 A | * | 1/2000 | Wiese | H04B 1/126 375/346 |
| 9,641,205 B1 | * | 5/2017 | Hyun | H04B 1/406 |

(Continued)

OTHER PUBLICATIONS

Alemohammad et al., "Photonic signal cancellation for co-site interference mitigation," in 2011—MILCOM 2011 Communications Conference, pp. 2142-2146, Nov. 2011.

(Continued)

*Primary Examiner* — Mina M Shalaby
(74) *Attorney, Agent, or Firm* — Smith Baluch LLP

(57) ABSTRACT

In-band full-duplex (IBFD) wireless systems offer the ability to revolutionize frequency spectrum utilization for future networks. For IBFD systems to work, the self-interference (SI) generated by each wireless node should be sufficiently mitigated, which becomes more challenging as the bandwidth increases. RF cancellation enables this interference reduction but has been limited so far to narrowband operation or restricted to distinctive environments. Fortunately, a photonic-enabled RF canceller can provide broadband interference cancellation using photonic components in a wideband vector modulator architecture with tunable time-delay taps. An example of this canceller with 20 canceller taps provides 25 and 20 dB of cancellation over 500-MHz and 1-GHz instantaneous bandwidths, respectively, and is tunable between 0.5 and 5.5 GHz. This photonic-enabled RF canceller provides the wideband operation and high tap counts for successfully deploying future wireless systems with IBFD technology.

20 Claims, 11 Drawing Sheets

(56) References Cited

U.S. PATENT DOCUMENTS

| | | | | |
|---|---|---|---|---|
| 10,027,429 | B1* | 7/2018 | Kiannejad | H04W 24/04 |
| 10,200,076 | B1* | 2/2019 | Choi | H04L 5/1461 |
| 10,581,155 | B1* | 3/2020 | Gradinaru | H04B 1/40 |
| 2011/0002371 | A1* | 1/2011 | Forenza | H04B 17/309 375/227 |
| 2011/0003606 | A1* | 1/2011 | Forenza | H04B 7/0417 455/501 |
| 2012/0251031 | A1* | 10/2012 | Suarez | G02F 2/002 385/3 |
| 2012/0294608 | A1* | 11/2012 | Prucnal | H04B 1/109 398/39 |
| 2014/0233519 | A1* | 8/2014 | Nagata | H04B 7/024 370/329 |
| 2015/0043685 | A1* | 2/2015 | Choi | H04L 27/2691 375/346 |
| 2015/0171903 | A1* | 6/2015 | Mehlman | H04B 1/10 375/346 |
| 2015/0280893 | A1* | 10/2015 | Choi | H04L 5/14 370/281 |
| 2015/0333847 | A1* | 11/2015 | Bharadia | H04L 5/1461 455/63.1 |
| 2016/0285486 | A1* | 9/2016 | Qin | H04B 17/345 |
| 2017/0104576 | A1* | 4/2017 | Liu | H04B 1/525 |
| 2017/0170903 | A1* | 6/2017 | Jain | H04B 10/90 |
| 2017/0179983 | A1* | 6/2017 | Choi | H04B 1/109 |
| 2017/0353212 | A1* | 12/2017 | Bharadia | H04L 5/1461 |
| 2019/0268029 | A1* | 8/2019 | Hahn | H04L 5/14 |

OTHER PUBLICATIONS

Bharadia et al., "Full Duplex Radios," SIGCOMM Comput. Commun., pp. 375-386, Aug. 2013.

Blow et al., "Microwave photonic interference canceller: Noise figure reduction via balanced architecture," in 2016 IEEE International Topical Meeting on Microwave Photonics (MWP), pp. 157-160, Oct. 2016.

Chang et al., "A microwave photonic canceller for improved interference rejection in full duplex radio," in 2016 IEEE Photonics Conference (IPC), pp. 493-494, Oct. 2016.

Chang et al., "A novel analog photonic method for broadband multipath interference cancellation," IEEE Microwave and Wireless Components Letters, vol. 23, pp. 377-379, Jul. 2013.

Chang et al., "Adaptive optical self-interference cancellation using a semiconductor optical amplifier," IEEE Photonics Technology Letters, vol. 27, pp. 1018-1021, May 2015.

Chang et al., "Full-duplex spectrum sensing in cognitive radios using optical self-interference cancellation," in 2015 9th International Conference on Sensing Technology (ICST), pp. 341-344, Dec. 2015.

Chang et al., "Integrated microwave photonic circuit for self-interference cancellation," IEEE Transactions on Microwave Theory and Techniques, vol. 65, pp. 4493-4501, Nov. 2017.

Chang et al., "Optical analog self-interference cancellation using electro-absorption modulators," IEEE Microwave and Wireless Components Letters, vol. 23, pp. 99-101, Feb. 2013.

Chang et al., "Rf characterization of an integrated microwave photonic circuit for self-interference cancellation," IEEE Transactions on Microwave Theory and Techniques, vol. 66, pp. 596-605, Jan. 2018.

Coleman et al., "A reflective newton method for minimizing a quadratic function subject to bounds on some of the variables," SIAM J. on Optimization, vol. 6, pp. 1040-1058, Apr. 1996.

Cox et al., "Tiprx: A transmit-isolating photonic receiver," Journal of Lightwave Technology, vol. 32, pp. 3630-3636, Oct. 2014.

Friedlander, "Bcls: software package for solving bound constrained least-squares problems," Mar. 2007. Accessed at https://www.cs.ubc.ca/~mpf/bcls/ on Feb. 11, 2019. 1 pages.

Grant et al., "Cvx: Matlab software for disciplined convex programming, version 2.1." Mar. 2014. Accessed at http://cvxr.com/cvx. on Feb. 11, 2019. 2 pages.

Grant et al., "Graph implementations for nonsmooth convex programs," in Recent Advances in Learning and Control (V. Blondel, S. Boyd, and H. Kimura, eds.), Lecture Notes in Control and Information Sciences, pp. 95-110, Springer-Verlag Limited, 2008.

Han et al., "Rf self-interference cancellation using phase modulation and optical sideband filtering," IEEE Photonics Letters, vol. 29, pp. 917-920, Jun. 2017.

Huusari et al., "Wideband self-adaptive rf cancellation circuit for full-duplex radio: Operating principle and measurements," in 2015 IEEE 81st Vehicular Technology Conference (VTC Spring), pp. 1-7, May 2015.

Kolodziej et al., "Multitap rf canceller for in-band full-duplex wireless communications,"IEEE Transactions on Wireless Communications, vol. 15, pp. 4321-4334, Jun. 2016.

Lu et al., "Performance comparison of optical interference cancellation system architectures," Appl. Opt., vol. 52, pp. 2484-2493, Apr. 2013.

Sabharwal et al., "In-Band Full-Duplex Wireless: Challenges and Opportunities," IEEE Journal on Selected Areas in Communications, vol. 32, pp. 1637-1652, Sep. 2014.

Suarez et al., "Incoherent method of optical interference cancellation for radio-frequency communications," IEEE Journal of Quantum Electronics, vol. 45, pp. 402-408, Apr. 2009.

Sun et al., "Demonstration of over-the-air rf self-interference cancellation using an optical system," IEEE Photonics Technology Letters, vol. 29, pp. 397-400, Feb. 2017.

Urick et al., "Photonics for electronic interference suppression," in 2017 IEEE Avionics and Vehicle Fiber-Optics and Photonics Conference (AVFOP), pp. 1-2, Nov. 2017.

Zhang et al., "A survey of advanced techniques for spectrum sharing in 5g networks," IEEE Wireless Communications, vol. 24, pp. 44-51, Oct. 2017.

Zhang et al., "Self-interference cancellation using dual-drive Mach-Zehnder modulator for in-band full-duplex radio-over-fiber system," Opt. Express, vol. 23, pp. 33205-33213, Dec. 2015.

Zhou et al., "Wideband co-site interference cancellation based on hybrid electrical and optical techniques," Opt. Lett., vol. 39, pp. 6537-6540, Nov. 2014.

Zhou et al., "Wideband optical multipath interference cancellation based on a dispersive element," IEEE Photonics Technology Letters, vol. 28, pp. 849-851, Apr. 2016.

* cited by examiner

METHODS AND APPARATUS FOR PHOTONIC-ENABLED RADIO-FREQUENCY (RF) CANCELLATION

CROSS-REFERENCE TO RELATED APPLICATION(S)

This application claims the priority benefit, under 35 U.S.C. § 119(e), of U.S. Application No. 62/594,348, entitled "Photonic-Enabled RF Cancellers," which was filed on Dec. 4, 2017, and is incorporated herein by reference in its entirety.

GOVERNMENT SUPPORT

This invention was made with Government support under Contract No. FA8721-05-D-0001 awarded by the U.S. Air Force. The Government has certain rights in the invention.

BACKGROUND

In-Band Full-Duplex (IBFD) technology represents a paradigm shift from existing wireless schemes by promising significant spectral and networking efficiency increases for future systems. IBFD is also known as Simultaneous Transmit and Receive (STAR) or Same-Frequency Full-Duplex (SFFD), and allows each node of a wireless network to transmit and receive on the same frequency at the same time. The spectral efficiency gains arise from users occupying the same frequency instead of utilizing different bands and/or time slots like traditional systems, which are known as frequency-division duplexing (FDD) and time-division duplexing (TDD), respectively. The networking efficiency increases come from reducing the communication overhead that is associated with coordination among different nodes. These system benefits only become possible if the main IBFD hurdle, which is reducing the resulting node's self-interference (SI) signal, is sufficiently overcome.

In realistic wireless networks, SI is comprised of the direct path coupling between the transmitter and receiver as well as multipath reflections from the surrounding environment. Within a typical node, this SI is mitigated using multiple cancellation layers that combine passive, analog, and digital techniques. Cancellers are typically designed with multiple taps that allow them to address several multipath reflection signals, such that the more canceller taps, the more multipath the canceller can mitigate.

To date, radio-frequency (RF) cancellers have been demonstrated with 2, 4, and 16 canceller taps. These RF cancellers utilized only RF components, which significantly limited both their instantaneous and tunable operational bandwidths, such that the widest reported bandwidth was 120 MHz centered at 2.45 GHz.

Recently, the incorporation of microwave-photonic components into canceller systems to drastically increase their operational bandwidths for co-site interference mitigation and IBFD applications has been explored. These cancellers operate by modulating the RF signal onto one or more optical carriers for interference mitigation in the optical domain. The mitigated optical signals are converted back to the RF domain using one or more photodetectors. These microwave photonic cancellers can be categorized based on the modulation of the optical signal with the RF signal. The RF-to-optical modulation types include external optical intensity modulation, direct laser modulation, external phase modulation, and polarization modulation.

While microwave photonic cancellers with these RF-to-optical modulation types can deliver wideband cancellation, they have been demonstrated with only one, two, or three canceller taps and an unrealistic frequency-flat SI channel response, which produces very wideband results, including one case with an instantaneous bandwidth of 25 GHz. The modest canceller tap counts limit the flexibility of these cancellers in different multipath environments. Unfortunately, the tap counts themselves are restricted by the use of optical couplers and combiners and the relatively small amount of tunable time delay.

In addition to these drawbacks, these microwave-photonic cancellers perform the cancellation in the optical domain, which requires modulating the received RF signal onto an optical carrier. In order to minimize degradation of the receiver performance, most of these microwave-photonic cancellers are located after the receiver's low-noise amplifier (LNA), which greatly restricts their usefulness for IBFD applications since the LNA is subject to the full SI signal.

SUMMARY

A photonic-enabled RF canceller with a vector modulator architecture provides cancellation in the RF domain over both wide instantaneous and tuning bandwidths. It maps SI to a particular optical wavelength, then writes the vector components of the RF signal to an optical carrier at that wavelength. The vector components are amplitude-modulated and time-delayed in the optical domain, transduced from the optical domain to the RF domain, and combined with the original RF signal to cancel the SI.

An inventive photonic-enabled RF canceller can be scaled to more than the 20 canceller taps. It overcomes the bandwidth challenges of conventional all-electronic RF cancellers by incorporating wideband photonic components, but does not suffer the drawbacks of limited tap counts or performing cancellation in the optical domain like the aforementioned systems.

One example of the inventive technology is an RF canceller that includes an array of tunable lasers, an optical combiner (e.g., a wavelength division multiplexer) in optical communication with the array of tunable lasers, a modulator in optical communication with the optical combiner, a first delay line in optical communication with a first output of the modulator via a first circulator, a first photodetector in optical communication with the first delay line via the first circulator, a second delay line in optical communication with a second output of the modulator via a second circulator, a second photodetector in optical communication with the second delay line via the second circulator, and a combiner operably coupled to the first photodetector and the second photodetector.

In operation, the array of tunable lasers emits laser beams at different wavelengths. The optical combiner to combines the laser beams, and the modulator modulates the laser beams with an in-phase component of an RF signal. The modulator's first output emits first in-phase modulated laser beams and its second output emits second in-phase modulated laser beams. The second in-phase modulated laser beams are phase-shifted by 180° with respect to the first in-phase modulated laser beams.

The first delay line delays the first in-phase modulated laser beams by amounts corresponding to the respective wavelengths of the first in-phase modulated laser beams. The first photodetector detects the first in-phase modulated laser beams. Similarly, the second delay line delays the second in-phase modulated laser beams by amounts corresponding to the respective wavelengths of the second in-phase modulated laser beams. The second photodetector detects the second in-phase modulated laser beams. And the combiner combines the outputs of the first and second photodetectors.

The RF canceller may also include an array of variable optical attenuators, in optical communication with the array of tunable lasers, to attenuate the plurality of laser beams emitted by the array of tunable lasers.

In some cases, the RF canceller also includes a second array of tunable lasers, a second optical combiner in optical communication with the second array of tunable lasers, a second modulator in optical communication with the second optical combiner, a third delay line in optical communication with the first output of the second modulator via a third circulator, a third photodetector in optical communication with the third delay line via the third circulator, a fourth delay line in optical communication with the second output of the second modulator via a fourth circulator, a fourth photodetector in optical communication with the fourth delay line via the fourth circulator, a second combiner operably coupled to the third photodetector and the fourth photodetector, and a third combiner operably coupled to the first combiner and the second combiner.

In these cases, the second array of tunable lasers emits second laser beams at different wavelengths, and the second optical combiner combines the second laser beams. The second modulator modulates the second laser beams with a quadrature component of the RF signal. The second modulator's first output emits first quadrature modulated laser beams and its second output emits second quadrature modulated laser beams. The second quadrature modulated laser beams are phase-shifted by 180° with respect to the first quadrature modulated laser beams.

The third delay line delays the first quadrature modulated laser beams by amounts corresponding to the respective wavelengths of the first quadrature modulated laser beams. The third photodetector detects the first quadrature modulated laser beams. Likewise, the fourth delay line delays the second quadrature modulated laser beams by amounts corresponding to the respective wavelengths of the second quadrature modulated laser beams. And the fourth photodetector detects the second quadrature modulated laser beams. The second combiner combine an output of the third photodetector with an output of the fourth photodetector, and the third combiner combine an output of the first combiner with an output of the second combiner.

Another example of the inventive technology is a method of canceling interference from an RF signal. This method includes generating laser beams at different wavelengths and, optionally, attenuating the laser beams by amounts corresponding to the respective wavelengths of the laser beams. Modulating the laser beams with an in-phase component of the RF signal to produces first in-phase modulated laser beams and second in-phase modulated laser beams. The second in-phase modulated laser beams are phased-shifted by 180° with respect to the first in-phase modulated laser beams. The method continues with delaying the first and second in-phase modulated laser beams by amounts corresponding to their respective wavelengths, then detecting the first and second in-phase modulated laser beams to produce first and second RF outputs. Combining the first and second RF outputs at least partially cancels the interference in the RF signal.

The laser beams may be first laser beams, and the method may also include generating second laser beams at different wavelengths. Modulating the second laser beams with a quadrature component of the RF signal yields first and second quadrature modulated laser beams which are phased-shifted by 180° with respect to each other. The first and second quadrature modulated laser beams are delayed by amounts corresponding to their respective wavelengths, then detected to produce third and fourth RF outputs, respectively. Combining the third and fourth RF outputs with the first and second RF outputs at least partially cancels the interference in the RF signal.

Yet another example of the inventive technology is an RF canceller that includes a first in-phase modulator, a second in-phase modulator, a first quadrature modulator, a second quadrature modulator, and a combiner, operably coupled to the first in-phase modulator, the second in-phase modulator, the first quadrature modulator, and the second quadrature modulator. In operation, the first in-phase modulator modulates an amplitude of a first copy of at least one first optical carrier modulated with a first in-phase vector of an RF signal, the second in-phase modulator modulates an amplitude of a second copy of the at least one first optical carrier modulated with a second in-phase vector of the RF signal, the first quadrature modulator modulates an amplitude of a first copy of at least one second optical carrier modulated with a first quadrature vector of the RF signal, and the second quadrature modulator modulates an amplitude of a second copy of the at least one second optical carrier modulated with a second quadrature vector of the RF signal. The second in-phase and quadrature vectors are phase-shifted by 180° with respect to the first in-phase and quadrature vectors, respectively. And the combiner combines the first copy of the at least one first optical carrier, the second copy of the at least one first optical carrier, the first copy of the at least one second optical carrier, and/or the second copy of the at least one second optical carrier to cancel interference in the RF signal.

The first in-phase modulator may include a tapped delay line to delay the first copy of the at least one first optical carrier by a delay depending on a carrier wavelength of the at least one first optical carrier. The combiner may include a photodetector, in optical communication with the tapped delay line, to detect the first copy of the at least one first optical carrier. In these cases, the first copy of the at least one first optical carrier can comprise first copies of a plurality of optical carriers is at different wavelengths and the tapped delay line can comprises a fiber Bragg grating to reflect each first copy at a different propagation distance to impart the different delays.

The tapped delay line may be a first tapped delay line, in which case the second in-phase modulator comprises a second tapped delay line to delay the second copy of the at least one first optical carrier. If so, the first tapped delay line can have taps interleaved in wavelength with taps of the second tapped delay line.

The RF canceller may also include at least one light source to emit the plurality of optical carriers and a modulator, in optical communication with the at least one light source, to modulate an amplitude of each of the plurality of optical carriers. This modulator may include a variable optical attenuator.

The in-phase modulators can be implemented in a single Mach-Zehnder modulator, as can the quadrature modulators. These implementations may include bias controllers to bias the Mach-Zehnder modulators at quadrature bias.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 8:
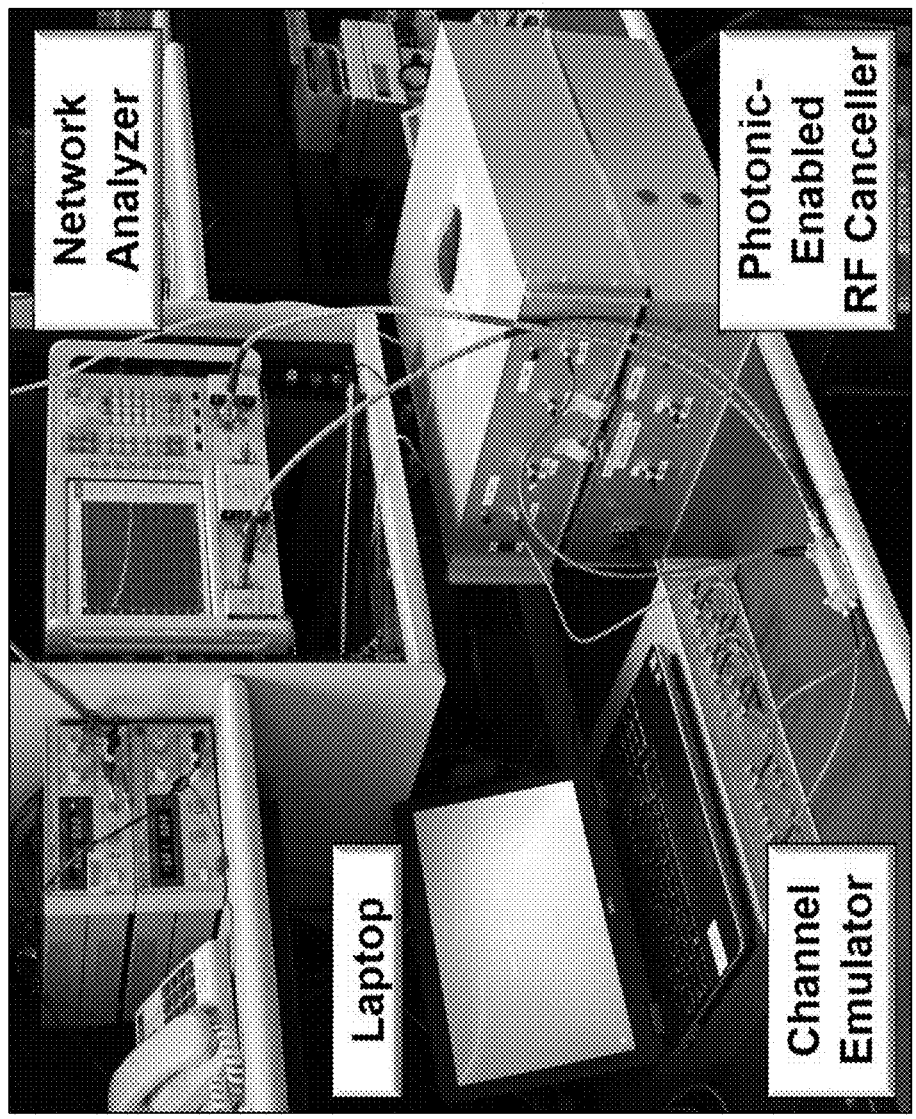
FIG. 8 is a photograph of a laboratory setup used for the photonic-enabled RF canceller evaluation with a control laptop, network analyzer, and channel emulator.
Figure 10:
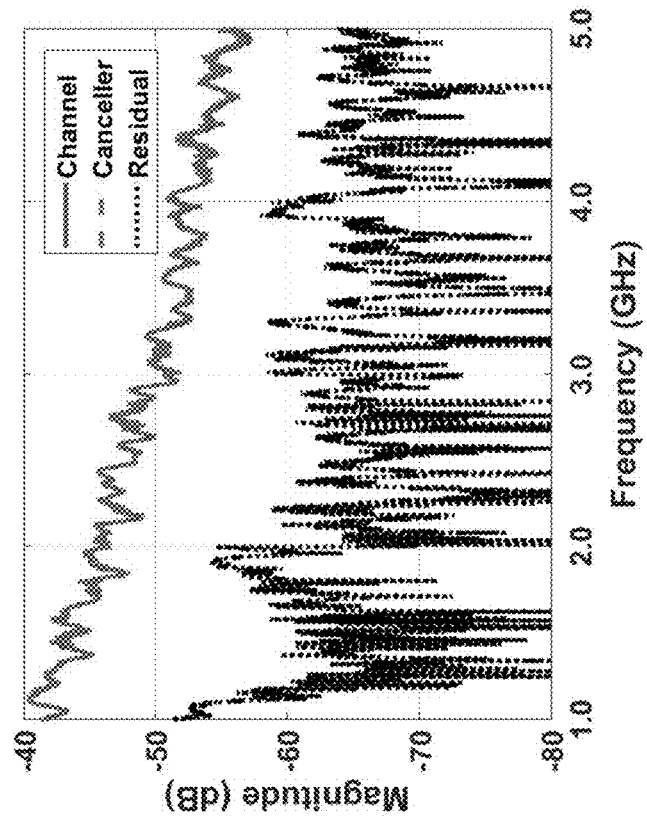

FIG. 10 is a plot of the combined magnitude of channel response, canceller output, and residual signal for 1 GHz instantaneous bandwidths tuned between 1.0 and 5.0 GHz in four segments measured using the setup of FIG. 8.

Figure 11:
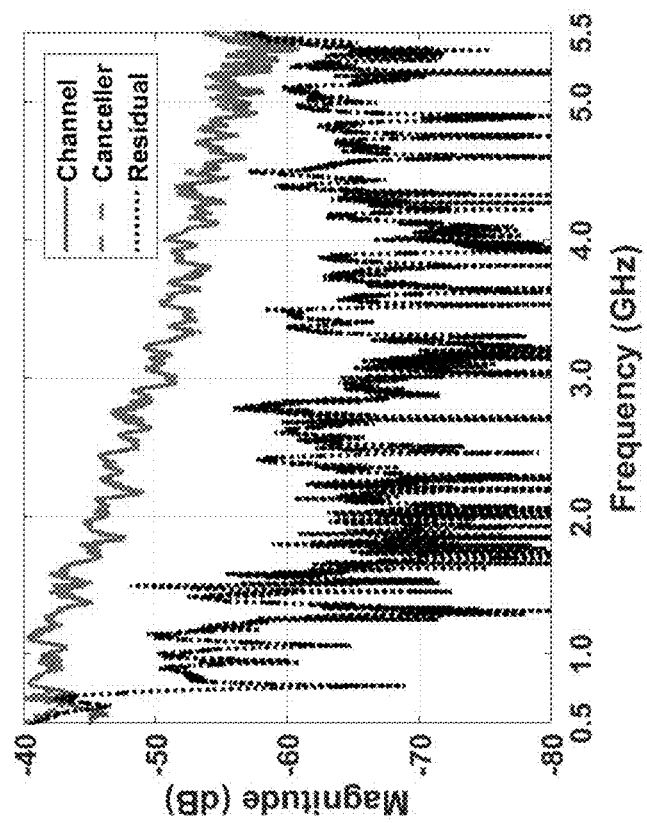

FIG. 11 is a plot of the combined magnitude of channel response, canceller output, and residual signal for 1 GHz instantaneous bandwidths tuned between 0.5 and 5.5 GHz in five segments measured using the setup of FIG. 8.

Figure 12:
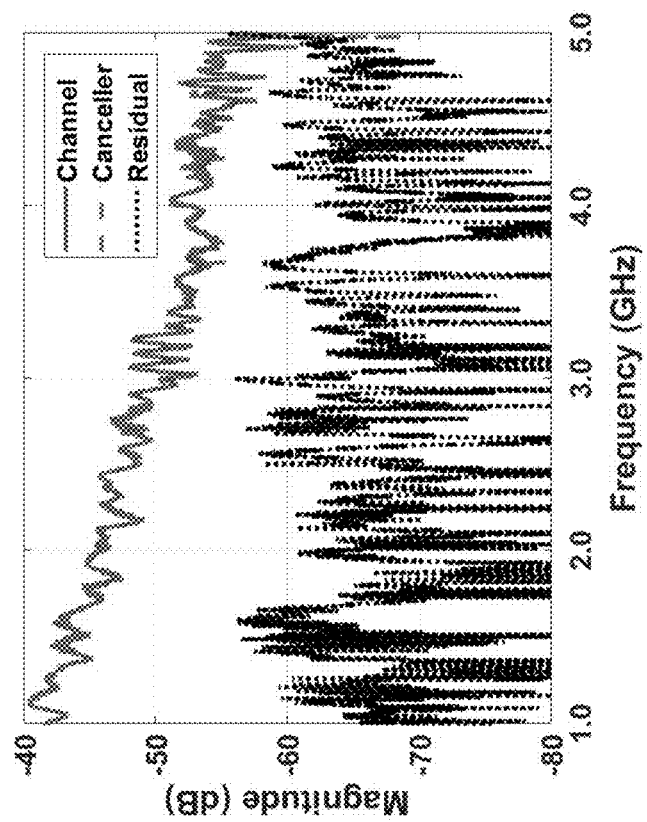

FIG. 12 is a plot of the combined magnitude of channel response, canceller output and residual signal for 500 MHz instantaneous bandwidths tuned between 1.0 and 5.0 GHz in eight segments measured using the setup of FIG. 8.

DETAILED DESCRIPTION

An RF canceller that uses photonic components can mitigate SI over a broad range of frequencies. This photonic-enabled RF canceller's vector modulator architecture provides a wide tuning bandwidth, while its high tap count delivers performance over wide instantaneous bandwidths. One example of this photonic-enabled RF canceller has 20 tunable time-delay taps that provide measured cancellations of 25 dB over 500 MHz of instantaneous bandwidth and 20 dB over 1 GHz, and is tunable between 0.5 and 5.5 GHz. There is no fundamental limit on the number of time-delay taps; rather, the number of taps is typically selected based on desired size, cost, and application. This photonic-enabled RF canceller can be combined with other SI mitigation layers to create a complete IBFD node that can deliver the desired efficiency enhancements for future wireless networks.

An inventive photonic-enabled RF canceller here operates on an RF signal in the RF domain and the optical domain. It splits the RF signal into in-phase and quadrature components in the RF domain, then modulates the in-phase and quadrature components on respective sets of optical carriers with a pair of Mach-Zehnder modulators. Each modulator produces two outputs separated in phase by 180°. This yields four sets of optical carriers, each modulated with a different vector component of the RF signal: a first set modulated with the positive in-phase (0°) component; a second set modulated with the positive quadrature (90°) component; a third set modulated with the negative in-phase (180°) component; and a fourth set modulated with the negative quadrature (270°) component.

Each optical carrier is at a different wavelength and is modulated in amplitude before being modulated with the vector components of the RF signal. After being modulated with the vector components of the RF signal, the optical carriers are time-delayed by amounts corresponding to their wavelengths. Photodetectors convert the amplitude-modulated, time-delayed optical carriers into amplitude-modulated, time-delayed RF-domain versions of the vector components of the RF signal. These RF-domain versions are added in the RF domain to cancel the interference in the RF signal.

Because the SI signal being canceled lies in one quadrant of the complex plane, it can be cancelled using an appropriate vector sum of a pair of in-phase and quadrature components. For example, if the SI signal is in the first quadrant of the complex plane, it can be cancelled by summing appropriately weighted positive in-phase and quadrature components; if it is in the second quadrant, it can be cancelled by summing appropriately weight positive in-phase and negative quadrature components; and so on. The unused vector components can be suppressed in the optical domain as explained below.

An In-Band Full-Duplex (IBFD) Node with a Photonic-Enabled RF Canceller

Figure 1:
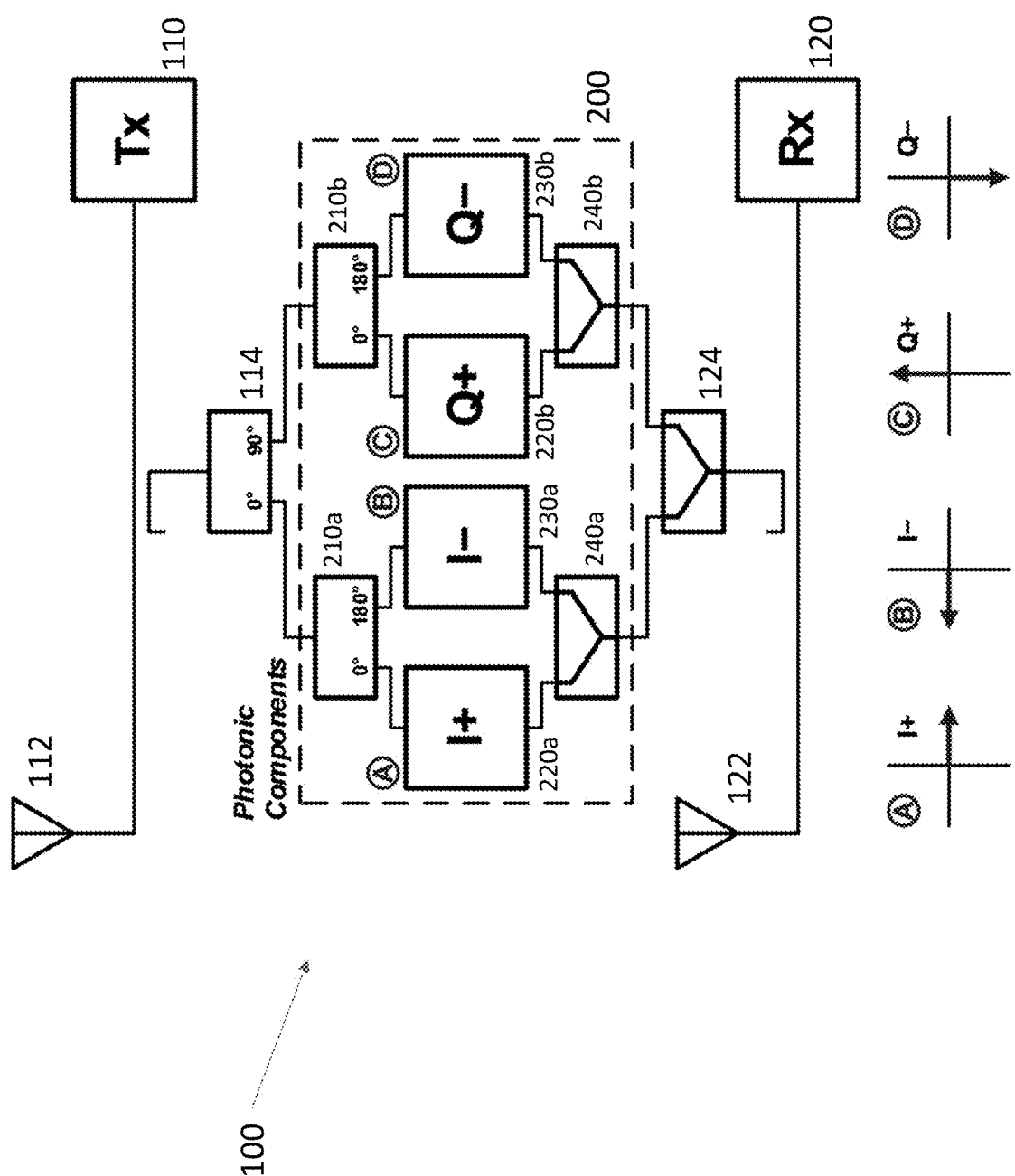
FIG. 1 shows a radio-frequency (RF) canceller inserted into an IBFD system, highlighting the photonic components, vector modulator architecture, and internal phase states.

FIG. 1 shows a photonic-enabled RF canceller 200 incorporated into an In-Band Full-Duplex (IBFD) transceiver node 100. The IBFD node 100 includes a transmitter 110 coupled to a transmit antenna 112 and a receiver 120 coupled to a receive antenna 122. An first coupler 114 between the transmit antenna 112 and receiver 120 couples a small amount of the transmit output signal into the photonic-enabled RF canceller 200, which generates a broadband cancellation signal. A second coupler 124 between the receiver 120 and receive antenna 122 couples the output of the photonic-enabled RF canceller 200 into the receiver 120 for signal cancellation.

While coupling the transmitted signal with the coupler 114 between the transmitter 110 and the transmit antenna 112 reduces the IBFD node's output power and transmit-efficiency slightly, it gives the canceller 200 an input that contains the transmitter's nonlinear distortion and noise components. This allows the canceller 200 to cancel the transmitter's nonlinear distortion and noise components in addition to the main signal. This combined input to the canceller 200 is then modified to match the self-interference (SI) channel and coupled back in at the input of the receiver 120 where the cancellation takes place, and typically occurs before the low-noise amplifier (LNA; not shown), which is coupled before the receiver 120 to reduce or minimize receiver distortion.

In addition, FIG. 1 shows the functional blocks in the canceller 200 that can be implemented using photonic components. These photonic functional blocks include input hybrid couplers 210a and 210b (collectively, hybrid couplers 210) and in-phase and quadrature vector blocks 220a, 220b, 230a, and 230b, each of which is described in more detail below. The vector blocks may emit RF-domain outputs that can be combined into in-phase and quadrature signals with output couplers 240a and 240b (collectively, output couplers 240), respectively, whose outputs are coupled to the inputs of the second coupler 124.

The canceller 200 has a vector modulator architecture and utilizes four vector components (I+, I−, Q+, Q−), whose internally-generated phase states at points A, B, C, and D are displayed at the bottom of FIG. 1 for added clarity. By providing the appropriate amplitude weighting for each of these vectors in the optical domain, the canceller 200 can synthesize any magnitude and phase change of the input signal to produce the desired RF-domain output. It is this amplitude-only weighting of the vector modulator architecture that affords the canceller 200 the ability to tune over a wide range of operating frequencies. The impulse response of the canceller's vector modulator architecture can generally be described as the combination of the four vector components, such that $$h(t) = (h_{I+}(t) - h_{I-}(t)) + e^{j\frac{\pi}{2}}(h_{Q+}(t) - h_{Q-}(t)), \quad (1)$$

where this equation assumes that the input hybrid couplers 210 provide ideal phase shifts and amplitude differences, and there are no errors introduced by the output combining network (output couplers 240). The details of this equation and the canceller design as a whole are explained in more detail below.

Photonic-Enabled RF Canceller Architecture

Figure 2A:
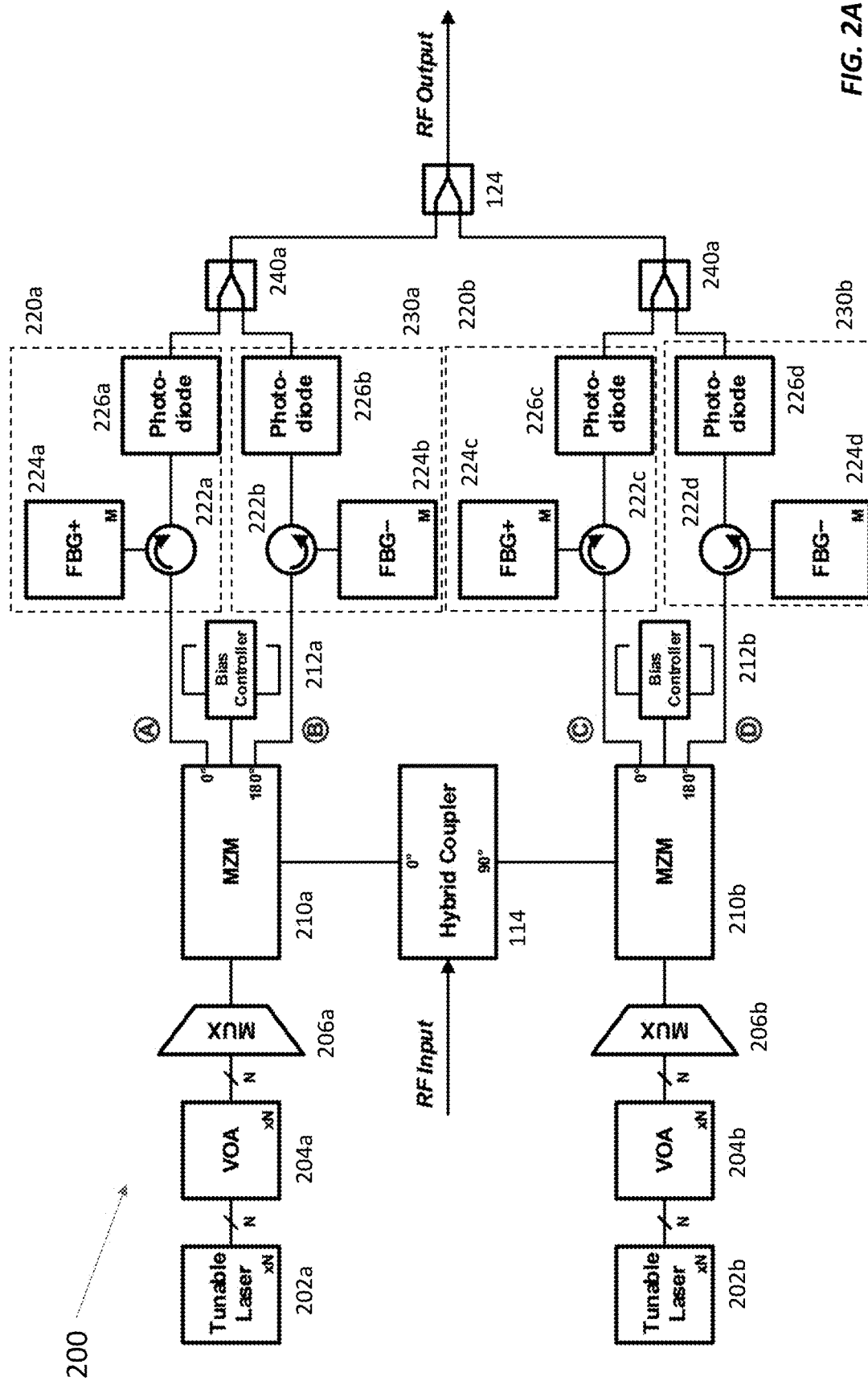
FIG. 2A is a detailed block diagram of a photonic-enabled RF canceller with variable optical attenuators (VOAs), wavelength-division multiplexers (MUXs), Mach-Zehnder modulators (MZMs) and Fiber Bragg Gratings (FBGs), and the internal phase states for both I- and Q-channels referenced from FIG. 1

FIG. 2A shows a more detailed block diagram of the canceller 200. The upper half of FIG. 2A represents the in-phase (I)-channel, while the lower half depicts the quadrature (Q)-channel. FIG. 2A depicts the canceller's RF input signal being split into I- and Q-components using the 90-degree hybrid coupler 114 (shown in FIG. 1). The outputs of the hybrid are then upconverted to THz frequencies using Mach-Zehnder modulators (MZMs) 210 that provide differential outputs with a relative phase shift of 180°. The electrical-voltage input to a given MZM 210 can be written as $$V_{IN}(t) = V_{DC} + V_{RF} \sin(\omega t), \quad (2)$$

where $V_{DC}$ captures the modulator's direct current (DC) bias, and the RF signal is represented as a simple sinusoid with maximum voltage, $V_{RF}$, and angular RF frequency, $\omega$.

Each MZM 210 is driven by a set of N optical carriers. The optical carriers are generated by CW laser arrays 202a and 202b (collectively, laser arrays 202). The lasers in these laser arrays 202 are tunable in frequency. The amplitudes of these N optical carriers are then individually adjusted using variable optical attenuator (VOA) arrays 204a and 204b (collectively, attenuator or VOA arrays 204), with one VOA per laser. These attenuator arrays 204 provide the amplitude-weighted tuning of the canceller's vector components and allow the canceller 200 to tailor its output to match the SI channel as desired. Each set of N individual optical carriers is combined onto a corresponding waveguide (e.g., optical fiber) using a corresponding optical combiner or wavelength-division multiplexer (MUX) 206a, 206b. The wavelength-combined beams form the optical inputs of the MZMs 210.

The differential outputs of the MZMs provide the 180-degree phase shift that is used to produce the subsequent vector components. They are indicated in FIG. 2A using the designators A, B, C, and D for the phase states in FIG. 1. At the outputs of each MZM 210, the relative phase shift experienced by all N optical carriers in one arm of the MZM can be represented by:

$$\phi(t) = \phi_{DC} + \phi_{RF} \sin(\omega t), \quad (3)$$

where $\phi_{DC} = \pi V_{DC}/V_\pi(0)$ and $\phi_{RF} = \pi V_{RF}/V_\pi(\omega)$, with $V_\pi$ being the frequency-dependent half-wave voltage. Biasing the MZM 210 at this half-wave voltage produces the desired 180-degree optical phase difference between the two outputs of the MZM 210.

The MZMs 210 are coupled to respective bias controllers 212a and 212b (collectively, bias controllers 212) that maintain these 180-degree phase differences between the MZMs' outputs over both temperature and time. Each bias controller 212 samples the intensities of both outputs of the corresponding MZM 210, compares the sampled intensities, and equalizes the sampled intensities by adjusting the MZM's bias accordingly.

The MZM outputs are then connected to Fiber Bragg Gratings (FBGs) 224a-224d (collectively, FBGs 224) through optical circulators 222a-222d (collectively, circulators 222). More specifically, output A of the in-phase MZM 210a goes through circulator 222a to FBG 224a, which reflects output A through circulator 222a to photodetector 226a. Similarly, output B of the in-phase MZM 210a propagates through circulator 222b to FBG 224b, which reflects output B through circulator 222a to photodetector 226b. On the quadrature side, outputs C and D of MZM 210b propagate through circulates 222c and 222d, respectively, to FBGs 224c and 224d, respectively, which reflect the outputs back through the respective circulators 222c and 222d to photodetectors 226c and 226d, respectively.

As explained in greater detail below, the FBGs 224 act as tapped delay lines that impart frequency-dependent time delays on the optical carriers. In other words, changing an optical carrier's carrier frequency changes the time delay experienced by the optical carrier as it propagates through to the photodetector 226 via the FBG 224. When the N optical carriers are at different frequencies, this causes the canceller to effectively creates N parallel vector modulators that serve as independent canceller taps. Thus, more taps allow the canceller to operate over a wider instantaneous bandwidth. By combining the N tunable lasers arrays 202 with the VOA arrays 204 and FBGs 224, each canceller tap can be tuned in amplitude and time, which increases the flexibility of the canceller by allowing it to adapt to different multipath environments.

The taps in each pair of FBGs 224 are interleaved in the wavelength domain. That is, the taps in the positive in-phase FBG 224a are spaced in wavelength at a period of Δλ starting at $\lambda_1$, and the taps in the negative in-phase FBG 224b are spaced in wavelength at the same period $\Delta\lambda$ starting at $\lambda_1 + \Delta\lambda$. (The taps in the positive quadrature FBG 224c and negative quadrature FBG 224d are staggered in the same fashion.) If the in-phase optical carriers are separated in wavelength by the same spacing $\Delta\lambda$ and the taps' reflection bands are narrower than half the spacing $\Delta\lambda/2$, then tuning the wavelengths of the in-phase optical carriers to align with the wavelengths of the positive in-phase FBG 224a causes the negative in-phase FBG 224b to suppress the negative in-phase optical carriers emitted by the 180-degree output of the first MZM 210a. Similarly, tuning the wavelengths of the in-phase optical carriers to align with the wavelengths of the negative in-phase FBG 224b causes the positive in-phase FBG 224a to suppress the positive in-phase optical carriers emitted by the 0-degree output of the first MZM 210a. Tuning the wavelengths of the quadrature optical carriers produces similar effects. The wavelengths of the in-phase and quadrature optical carriers can be tuned independently, making it possible to select different combinations of positive and negative in-phase and quadrature optical carriers for canceling the SI signal.

The reflected, appropriately delayed optical carriers coming out of the FBGs 224 are then directed towards photodetectors 226 through the use of the optical circulators 222 mentioned above. These photodetectors 226 remove the optical carriers, effectively converting the time-delayed, amplitude-adjusted signals back to the RF domain. The four photodetector outputs, representing the four vector components, are then summed together in the RF domain using a series of in-phase power combiners 240a, 240b, and 124 to create a single RF-domain canceller output as shown in FIG. 2A.

Fiber Bragg Gratings as Tapped Delay Lines

As understood by those of skill in the art, an FBG includes an optical fiber with a core whose refractive index varies periodically along its length. This periodic refractive index variation is a grating that reflects light at one or more specific wavelengths propagating through the core. That is, the FBG causes light at wavelengths in its reflection band to reverse direction and transmits light at wavelengths in its passband. The FBG's center frequency depends on the period of the spatial refractive index variation, its bandwidth depends on the number of periods, and its diffraction efficiency depends magnitude of the refractive index variation.

Figure 2B:
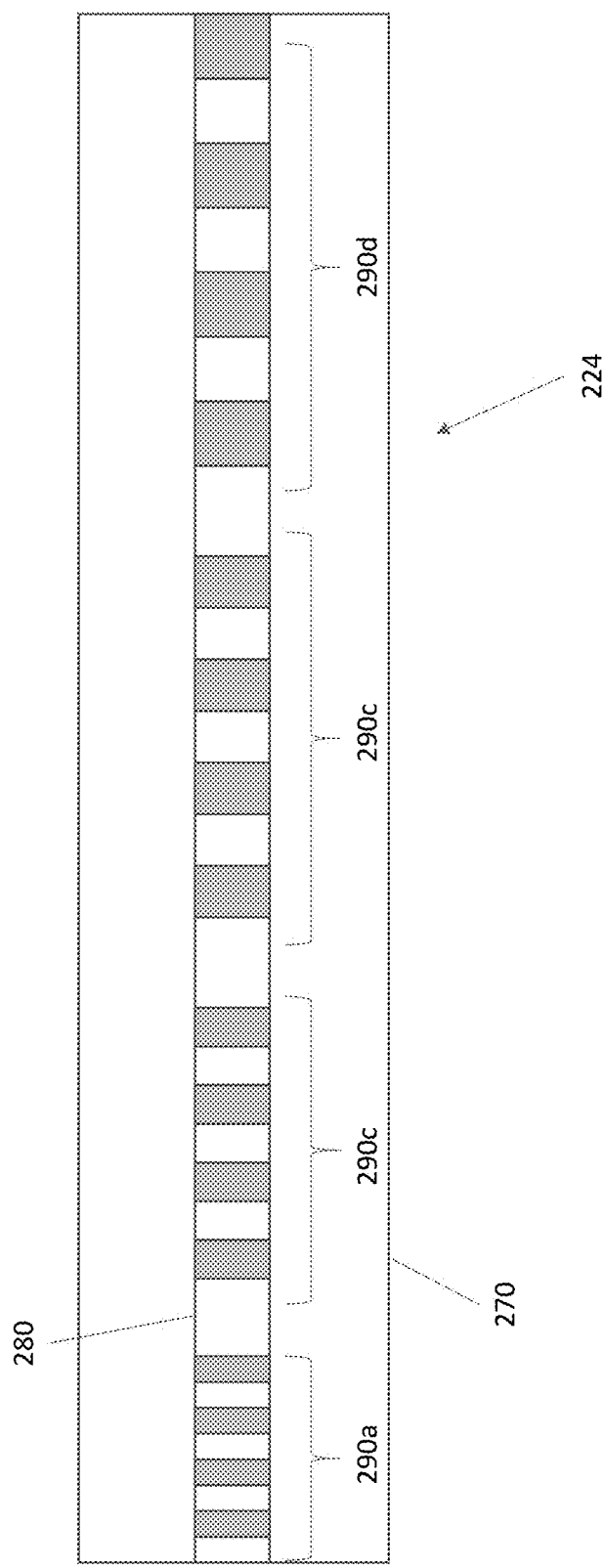
FIG. 2B illustrates an FBG suitable for use in the photonic-enabled RF canceller of FIG. 2A.

FIG. 2B shows one of the FBGs 224 in FIG. 2A in greater detail. This FBG 224 includes M discrete gratings 290a-290d (collectively, gratings 290) inscribed in the core 280 of an optical fiber 270 at fixed distances along the core 280. The shading in FIG. 2B represents the refractive index variation along the core 280 at different distances. Each grating 290 has a different period and therefore reflects light at a different wavelength. The refractive index perturbations (gratings 290) are deliberately inscribed into the core 280, so the distances at which the signal reflections occur are translated into corresponding time delays that depend on the chosen optical carrier frequencies, effectively causing the FBG 224 to behave as a frequency-dependent dielectric mirror.

The grating indices along the FBG 224 shown in FIG. 2B, which has M uniformly spaced gratings 290, can be described by:

$$m[f_c] = \frac{f_1 - f_c}{f_{spacing}} + 1, \tag{4}$$

where $f_1$ is the center frequency of the first grating 290a of the FBG 224, $f_{spacing}$ is the frequency spacing between the gratings' center frequencies, and $f_c$ is the tunable optical carrier frequency. This equation presumes that $f_c$ is shifted from $f_1$ by an integer multiple of $f_{spacing}$ so that only discrete indices are represented.

The resulting FBG time delays that depend on these indices can then be formulated as $$\tau[m] = \frac{2dn}{c}\left(m + \left\lfloor \frac{m-1}{s} \right\rfloor\right), \tag{5}$$

where d is the distance along the fiber to each grating, n is the index of refraction of the fiber, and c is the speed of light. The $\lfloor \cdot \rfloor$ symbol represents the floor function and is included to account for the added delay that corresponds to the distances between some gratings 290 in the FBG 224. This extra distance occurs when the FBG 224 is made by splicing together multiple smaller FBGs, each of which includes several gratings, with splices added after every s gratings, and that the added delays match the uniform spacing, which results in a missing point after every s points along the FBG 224.

FIG. 2B shows an FBG 224 with four gratings 290, each of which has four grating periods, with the grating periodicity increasing monotonically from left to right and spaces between adjacent gratings 290. Other FBGs 224 may have more or fewer gratings, each of which may have more or fewer grating periods. The spacing between gratings can be larger or smaller and can vary. In the limit where the spacing shrinks to zero, the FBG's discrete gratings may become a chirped grating whose period varies along the FBG's length to provide time delays that very continuously as a function of optical carrier frequency. (Conversely, the FBG 224 in FIG. 2A has discrete gratings 290 with discrete periodicities, so it reflects light at discrete wavelengths and transmits light at other wavelengths.)

An Analytic Model of a Photonic-Enabled RF Canceller

An analytical model of the canceller can be used to gain insight into the canceller's operation and influence the design of the canceller's hardware. Such a model can provide a simulation tool with which the effect of different parameters can be investigated and traded against one another to produce the optimal component selection for the canceller's intended configuration and incorporation into an IBFD node.

As discussed above, the canceller's RF input signal is modulated onto an optical carrier using MZMs and later extracted from the optical domain using four photodetectors. These optical signal processing functions can be described using intensity modulation direct-detection (IMDD) link analysis. As such, when the MZMs are operating at their $V_\pi/2$ or quadrature bias point, which corresponds to the modulator outputs being offset by the desired 180 degrees, the resulting DC current on one of the photodetectors can be described as $$I_{DC} = \frac{R \, l_{tot} P_{opt}(f_c)}{2}, \tag{6}$$

where R is the responsivity of the photodetector, $l_{tot}$ is the total insertion loss of the optical link, and $P_{opt}(f_c)$ is the optical power output from one of the tunable lasers that is dependent on the laser frequency, $f_c$.

The total insertion loss of the optical link can further be broken into two components, such that $$l_{tot} = l_{fixed} \cdot l_{var}, \quad (7)$$

where the fixed and variable loss elements of the link are represented separately. The fixed loss pieces can be expanded to $$l_{fixed} = l_{MUX} \cdot l_{MZM} \cdot l_{CPLR} \cdot l_{CIRC_{1-2}} \cdot l_{CIRC_{2-3}}, \quad (8)$$

where $l_{MUX}$ is the insertion loss of the MUX, $l_{MZM}$ is the insertion loss of the MZM, $l_{CPLR}$ is the insertion loss of the optical coupler, and $l_{CIRC_{1-2}}$ and $l_{CIRC_{2-3}}$ are the circulator insertion losses from ports 1 to 2 and 2 to 3, respectively.

The link's variable loss components can be characterized by $$l_{var} = l_{VOA}(V_{VOA}) \cdot l_{FBG}(f_c), \quad (9)$$

where $l_{VOA}(V_{VOA})$ represents the insertion loss of the VOA that is a function of the applied VOA tuning voltage, and $l_{FBG}(f_c)$ captures the insertion loss of the FBG that depends on the distance to the reflection point, which is dictated by the optical carrier frequency, as well as the intrinsic reflection efficiency of the FBG.

When the MZM's input includes an RF signal in addition to the DC bias, such as described in Eq. 2, the total photocurrent on one of the photodetectors can be written as $$I_{PD} = I_{DC}[1 + \cos(\phi(t))]. \quad (10)$$

Since $\phi(t)$ is sinusoidal with a DC term establishing the quadrature bias, this equation produces a series of Bessel functions of the first kind that describe an infinite number of sidebands modulated with the RF input and provides a complete signal description of the output photocurrent. When the RF input is assumed to operate within the linear region of the MZM around the quadrature bias point, a small-signal approximation for the Bessel function can be utilized to derive the RF output power as $$P_O = \frac{I_{DC}^2 \phi_{RF}^2 Z_O |H_{PD}(\omega)|^2}{2}, \quad (11)$$

where $Z_O$ is the RF output impedance of the photodetector and $H_{PD}(\omega)$ is the RF frequency response of the photodetector, which accounts for the photodetector's output matching network.

The total small-signal RF gain for the optical components of the canceller (from the MZM input to the photodetector output) can be established with the help of the output power from Eq. 11, and produces $$G_{opt} = \frac{I_{DC}^2}{V_\pi^2} \pi^2 Z_I Z_O |H_{PD}(\omega)|^2, \quad (12)$$

where $Z_I$ is the RF input impedance of the MZM and Eq. 3 has been inserted after being modified such that $\phi_{RF}^2 = (2\pi^2 P_I Z_I)/V_\pi^2$, where $P_I$ is the RF input power. The effect of the RF components at the input and output of the canceller can be included to produce the complete small-signal gain of the canceller as $$\alpha = G_{opt} \cdot |H_{HYB}(\omega)| \cdot |H_{CBR_1}(\omega)| \cdot |H_{CBR_2}(\omega)|, \quad (13)$$

where $H_{HYB}(\omega)$, $H_{CBR_1}(\omega)$, $H_{CBR_2}(\omega)$ are the frequency responses of the input 90-degree hybrid coupler, first output combiner and second output combiner, respectively. This gain equation can be used to help understand the impact of the individual component specifications of the design.

Figure 3:
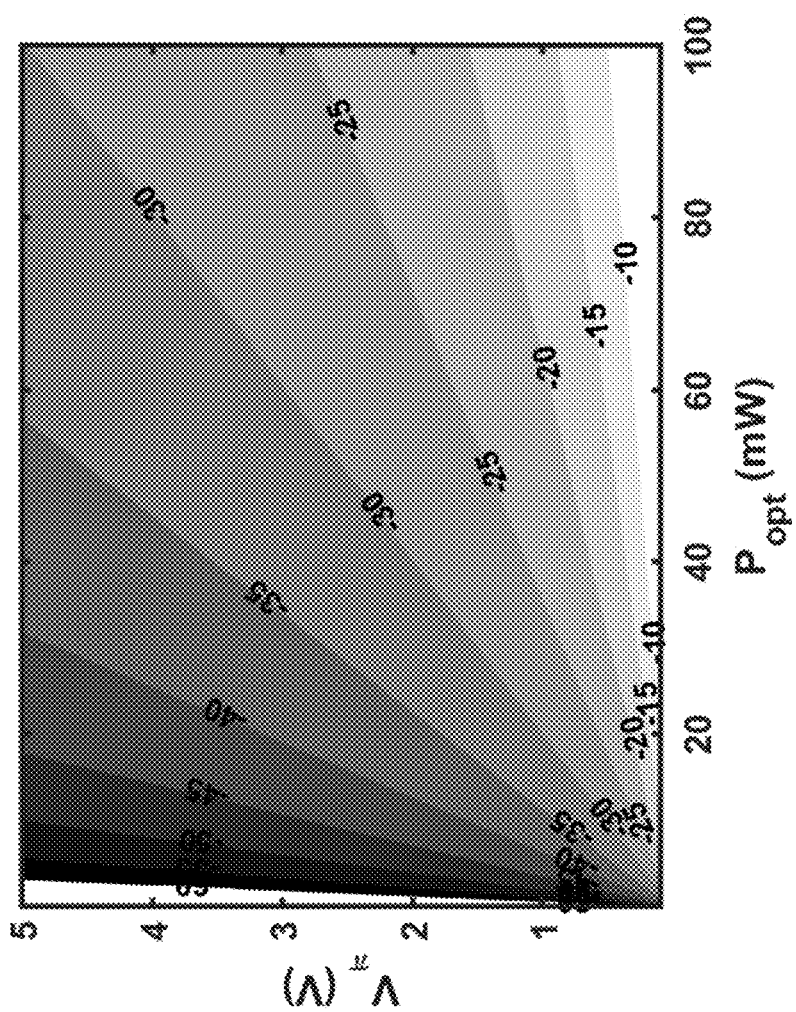
FIG. 3 is a plot of simulated RF gain (in dB) for a single canceller tap showing reliance on both the optical laser power, $P_{opt}$, and the modulator's $V_\pi$ voltage.

FIG. 3 plots the resulting gain of a single canceller tap versus optical laser power, $P_{opt}$, and the MZM bias voltage, $V_\pi$. FIG. 3 indicates that the canceller gain is a strong function of both the bias voltage and the laser output power and can be increased or maximized with low $V_\pi$ and high $P_{opt}$, as expected. While the simulation shown in FIG. 3 assumed some typical values for the other parameters (such as the optical component losses), it offers insight into the performance levels that are achievable using realistic inputs and can be utilized to aid in the optimal hardware selection that will be described in the next subsection.

When considering the canceller as a whole for system-level simulations, the impulse responses of the individual vector components introduced in Eq. 1 can be written in terms of the total canceller gain, such that $$h_v(t) = \Sigma_{n=1}^{N} \alpha_n (V_{VOA_n}, f_{c_n}) \delta(t - \tau_n[f_{c_n}]), \quad (14)$$

where v represents one of the four vector components and N is the total number of tunable lasers. This equation highlights the canceller's ability to tune each tap's amplitude and time delay by adjusting the VOA voltage, $V_{VOA}$, and optical carrier frequency, $f_c$, respectively. It is written in terms of power, but can simply be converted to voltage by taking the square root of $\alpha$.

The impulse response of Eq. 14 can be transformed to generate the frequency response of a single vector component as $$h_v(j\omega) = \Sigma_{n=1}^{N} \alpha_n (V_{VOA_n}, f_{c_n}) e^{-j\omega \tau_n[f_{c_n}]}, \quad (15)$$

where $\omega$ is the RF angular frequency. The frequency responses of the four vector components can then be combined to produce the complete frequency response of the canceller, such that $$H_{canc}(j\omega) = \sum_{n=1}^{N_{I+}} \alpha_n e^{-j\omega \tau_n[f_{c_n}]} + \sum_{n=1}^{N_{I-}} \alpha_n e^{j(\pi - \omega \tau_n[f_{c_n}])} + \sum_{n=1}^{N_{Q+}} \alpha_n e^{j(\frac{\pi}{2} - \omega \tau_n[f_{c_n}])} + \sum_{n=1}^{N_{Q-}} \alpha_n e^{j(\frac{3\pi}{2} - \omega \tau_n[f_{c_n}])}, \quad (16)$$

where the $\alpha$ dependence on $V_{VOA}$ and $f_c$ is omitted for brevity, and $N_{I+}$, $N_{I-}$, $N_{Q+}$ and $N_{Q-}$ are the total number of lasers assigned to the I+, I−, Q+ and Q− vector components, respectively. It is assumed that the lasers, N, are divided between the positive and negative vector components such that $N_{I+} + N_{I-} \leq N$, which applies to the Q-channel as well.

While calibrating and tuning the canceller can help mitigate the effect of the nominal amplitude and phase errors, Eqs. 14-16 do not include terms representing these errors. The equations also assume that the coaxial and fiber cable lengths are matched between the four vector component paths. The abovementioned errors are typically associated with realizable hardware, and can arise in both the input and output RF component networks as well as in the four optical IMDD links. While these error terms can easily be incorporated, the equations above provide an accurate model of the canceller with which parameter studies were performed that helped guide the assembly described immediately below.

Making an Example Photonic-Enabled RF Canceller

An example photonic-enabled RF canceller was built to demonstrate its functionality and to the investigate its performance. It was built according to the canceller block diagrams shown in FIGS. 1 and 2A and utilized commercially available parts, with the exception of the FBGs. The number of canceller taps, N, was set to 20. Other inventive cancellers may have more or fewer taps.

The RF input signal was split into I- and Q-channels using a 90-degree hybrid coupler from Krytar, which nominally introduced 1.2 dB of insertion loss. The CW-tunable lasers were implemented using micro integrable tunable laser assemblies (µITLA) from EMCORE Corporation. The µITLAs were capable of tuning over the entire optical communications C-band, 191.50 to 196.25 THz, and had +15 dBm of output power. (Alternatively, the µITLAs can be replaced by a white light source with discrete or tunable filters than can be modulated to pass or block individual wavelengths.) Following each of these µITLAs was a VOA from DiCon Fiberoptics that provided 0.5 dB of insertion loss and 30 dB of optical attenuation range, which translated to 60 dB of RF attenuation, for an applied analog voltage level ranging from 0 to 7 volts. The bias and control circuitry for the µITLAs and VOAs was condensed onto several printed circuit boards that were configured using an FPGA, which was connected to a laptop running MATLAB.

The VOA outputs were then combined onto a single fiber using an OZ Optics wavelength division multiplexer, which had 2 dB of insertion loss. This combined signal then drove EOSPACE's dual-output MZMs, which were selected because they had both low insertion loss of 2.5 dB and low $V_\pi$ of 2.5 V, and were specified with an RF bandwidth of DC to 6 GHz. While this MZM bandwidth specification limited the canceller's tunable frequency range, a different MZM could allow much wider frequency operation. The MZM outputs were then sampled using 1% single-mode fiber couplers, which translated to 0.4 dB of insertion loss. The coupled-off signals then fed a precision ditherless bias controller from YY Labs to create a feedback loop that ensured MZM operation at quadrature bias. A C-band 3-port circulator from LIGHTEL was chosen with insertion loss of 0.5 dB for all coupling directions.

This canceller had a set of two custom FBGs, one for the positive vector components (I+ and Q+) and one for the negative vector components (I− and Q−). Each FBG had M=80 gratings that spanned center frequencies from 192 to 196 THz with 50 GHz spacing and 1.3 ns of time delay between adjacent points. Other inventive cancellers may use different numbers of gratings, different center frequency spans, different center frequency spacings, and different time delays between gratings.

The two FBGs differ in the starting frequency, $f_1$, which they use for their first reflection point. This allows a single laser to be tuned in frequency to select either of the FBGs, making it possible to select either the positive or negative vector component for a given I- or Q-channel by changing the optical carrier frequency. The first tap of FBG+ was centered at 196.075 THz, while the first tap for FBG− was centered at 196.050 THz. The starting frequencies are offset by 25 GHz, which is half the spacing between center frequencies of adjacent taps.

Figure 4:
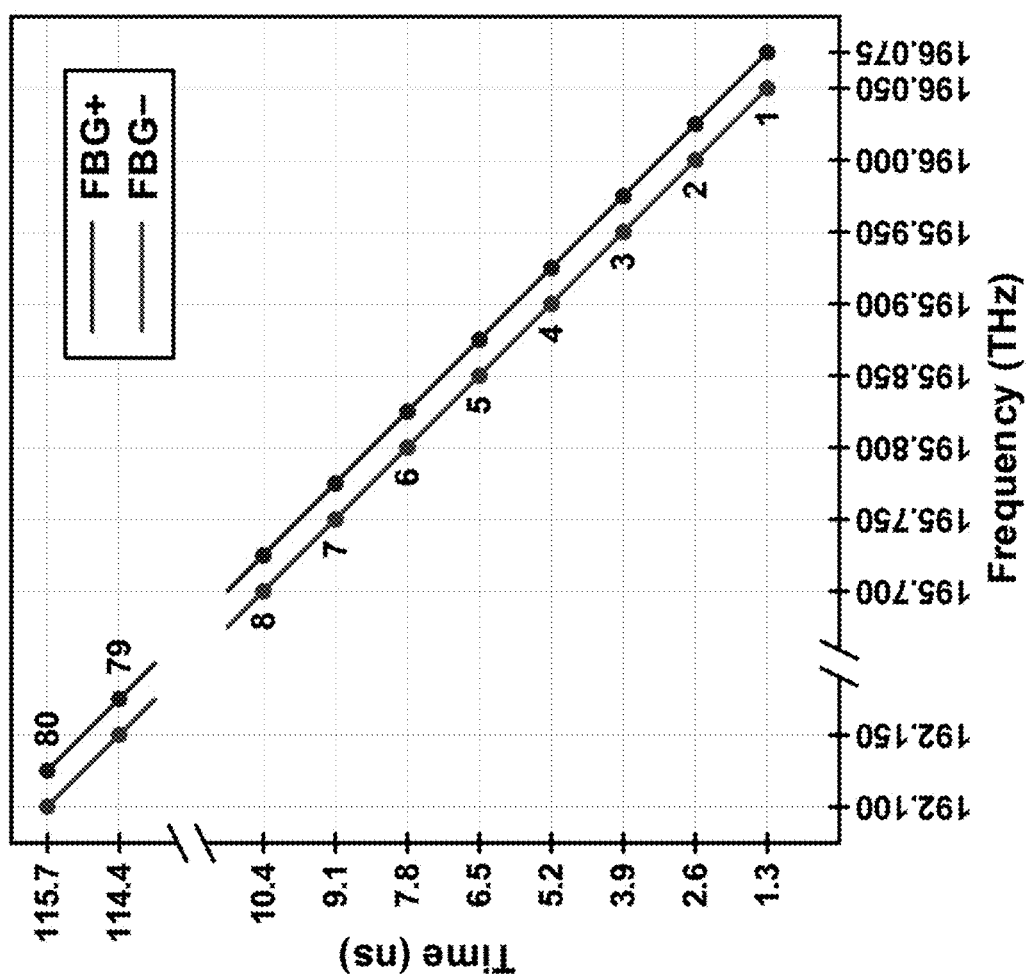
FIG. 4 is a plot of desired time delay, $\tau$, versus optical carrier frequency, $f_c$, to for all 80 taps of both FBG+ and FBG– in the photonic-enabled RF canceller of FIG. 2A.

FIG. 4 is a plot that shows the overall frequency and time delay correlation of both FBGs. This plot shows the center frequency and corresponding time delay of the first eight gratings starting in the bottom right corner, and then indicates the last two gratings in the top left corner. The same time delay is achieved by tuning to either FBG+ or FBG−. This makes it possible to produce the desired vector component addition at the canceller's output.

The FBG outputs were connected to photodetectors from Discovery Semiconductors that had 6 GHz of bandwidth and a responsivity, R, of 0.8 A/W. The four photodetector outputs were summed using three RF combiners from Krytar that covered 0.5 to 18.0 GHz with 1.5 dB of nominal insertion loss.

Figure 5:
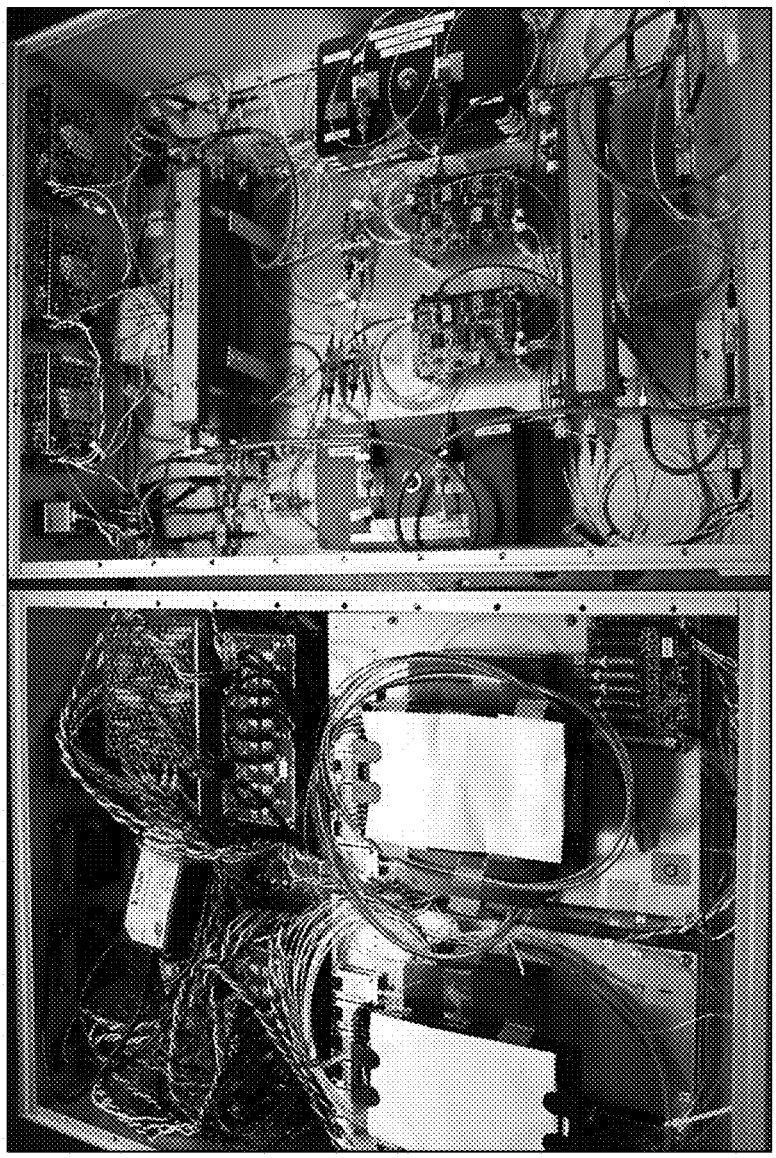
FIG. 5 is a photograph of a photonic-enabled RF canceller prototype system housed in two 3U rack-mount chassis: laser sections (left) and other components (right).

FIG. 5 is a photograph of the canceller with 20 taps. It was housed in two 3U rack-mount chassis. The left chassis contained 40 laser modules (20 each for both I- and Q-channels) along with the associated VOAs, MUXs, control circuitry, and power supplies. The right chassis stored the other photonic components as well as the RF input coupler and output combining network. Little to no effort was made to reduce this canceller's volume or weight, but other cancellers could certainly be miniaturized with the use of custom photonic integrated circuit (PIC) technology.

Tuning a Photonic-Enabled RF Canceller

The analysis of the tuning for this canceller produced a unique set of equations that integrate the canceller's large tap count and vector modulator architecture. While parallel equation sets stem from adaptive filter processing and can be used for digital cancellation in IBFD systems, a significant difference occurs in the representation of the weight outputs. Digital cancellation schemes typically produce complex weight values given their complex inputs, which is justified since these values can be synthesized digitally. But cancellers that rely on tuning analog voltages generally cannot apply complex weights. To account for this limitation on tuning analog voltages, the equations discussed here first limit the weights to real values and then further restrict them to be positive numbers within the range of 0 to 1. Weight values within this range can then be scaled to the appropriate VOA settings, and finally be used to configure the canceller as desired.

Figure 6:
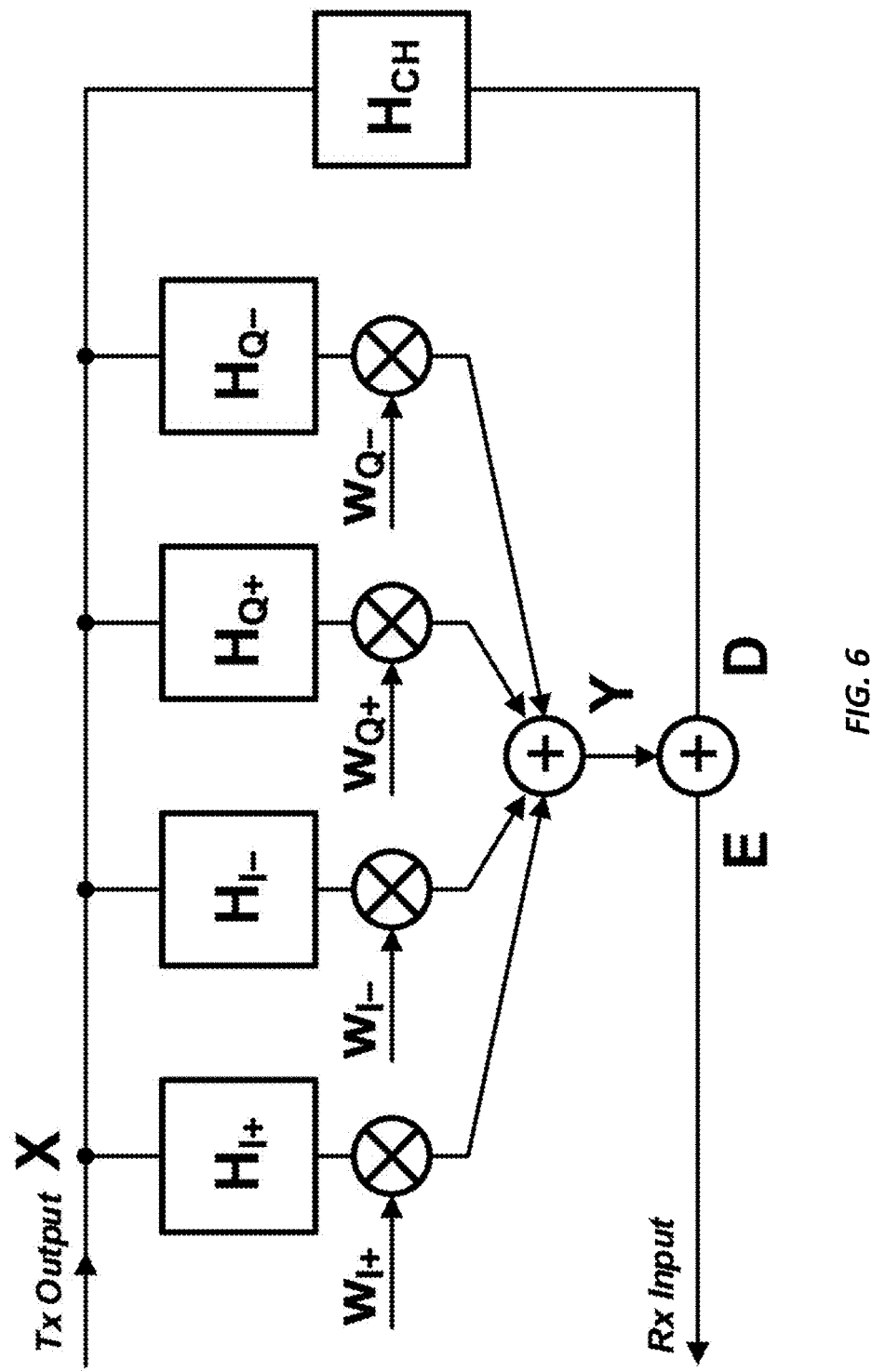
FIG. 6 shows a system model used for tuning derivation that indicates the wireless channel, $H_{CH}$, the weighted responses for the four vector components of the canceller, and the residual error signal, E, at the receiver input.

FIG. 6 depicts the tuning model of the canceller with its individual vector components ($H_{I+}$, $H_{I-}$, $H_{Q+}$, $H_{Q-}$), weighted and combined to form a single canceller output as well as a characteristic wireless channel response, denoted by $H_{CH}$. Together, these vector components model the canceller using complex L-by-N matrices that are assembled with measurements of the maximum-gain frequency response of each tap while the other taps are disabled. The vector components can be represented by the matrix, $$H_v = \begin{bmatrix} H_{v,T_1}(f_1) & H_{v,T_2}(f_1) & \cdots & H_{v,T_N}(f_1) \\ H_{v,T_1}(f_2) & H_{v,T_2}(f_2) & \cdots & H_{v,T_N}(f_2) \\ \vdots & \vdots & \ddots & \vdots \\ H_{v,T_1}(f_L) & H_{v,T_2}(f_L) & \cdots & H_{v,T_N}(f_L) \end{bmatrix}, \quad (17)$$

where v is a placeholder for I+, I−, Q+, or Q− (the four vector components), L is the total number of frequency samples for the desired tuning bandwidth, and N designates the total number of canceller taps. $H_{CH}$ is the frequency-domain response of the wireless channel, and is represented in a complex 1-by-L vector. The equations presented here focus on the frequency domain, and a similar set of tuning equations can be derived in the time domain.

It is assumed that the H-matrices shown in FIG. 6 can be measured by the IBFD node, such that $H_v$ is stored in a calibration table, and $H_{CH}$ is periodically sampled faster than the channel coherence time to ensure accurate channel estimates. This leaves the canceller's variable weights ($w_{I+}$, $w_{I-}$, $w_{Q+}$, $w_{Q-}$) to be calculated in order to reduce or minimize the SI at the receiver's input. These weights are N-by-1 complex vectors that contain the settings for each individual tap, such that $$w_v = \begin{bmatrix} w_{v,T_1} \\ w_{v,T_2} \\ \vdots \\ w_{v,T_N} \end{bmatrix}, \tag{18}$$

where v is again a placeholder for I+, I−, Q+ or Q−.

If the tuning of the canceller was performed using complex inputs for $H_v$ and $H_{CH}$, the resulting weights would be complex and could not be converted to analog voltages. Reformulating these inputs into a real-valued matrix and vector, respectively, gives output weights that are also real-valued. Thus, the composite canceller response can be represented as the real-valued matrix $$H_{canc} = \begin{bmatrix} \text{Re}(H_{I+}) & \text{Re}(H_{I-}) & \text{Re}(H_{Q+}) & \text{Re}(H_{Q-}) \\ \text{Im}(H_{I+}) & \text{Im}(H_{I-}) & \text{Im}(H_{Q+}) & \text{Im}(H_{Q-}) \end{bmatrix}, \tag{19}$$

which is 2L-by-4N in size and where Re and Im are the real and imaginary operators, respectively.

Similarly, the channel response can simply be converted to a real-valued 1-by-2L vector as $$G_{CH} = \begin{bmatrix} \text{Re}(H_{CH}) \\ \text{Im}(H_{CH}) \end{bmatrix}, \tag{20}$$

and the composite canceller weights can be represented by $$w_{canc} = \begin{bmatrix} w_{I+} \\ w_{I-} \\ w_{Q+} \\ w_{Q-} \end{bmatrix}, \tag{21}$$

which is a 4N-by-1 real-valued vector, as expected.

If the transmitter's frequency-domain output is denoted by X, then the canceller's combined vector output can be represented by Y, such that $$Y = H_{canc} \cdot w_{canc} \cdot X, \tag{22}$$

and the output of the wireless channel, D, can be signified as $$D = G_{CH} \cdot X. \tag{23}$$

These two signals are combined at the input of the receiver, and produce a residual SI error term, E, such that $$E = H_{canc} \cdot w_{canc} \cdot X + G_{CH} \cdot X. \tag{24}$$

Since the canceller is trying to reduce or minimize this error, Eq. 24 can be equated to zero and then rearranged to solve for the tuning weights $$w_{canc} = (H_{canc}^T \cdot H_{canc})^{-1} \cdot H_{canc}^T \cdot G_{CH}. \tag{25}$$

Solving Eq. 25 using an ideal vector modulator model for the canceller should produce only positive weights since, in theory, the modulator has the desired positive and negative vectors. This, however, was not the case when measured data from the prototype was utilized, which resulted in some of the weights being negative. Without being bound by any particular theory, this was most likely due to the fact that the real hardware introduced some non-ideal errors in both amplitude and phase. An optimization loop could be created to attempt to remove negative-valued weights and prioritize positive ones for realistic datasets, but might not provide the optimal weight set.

In order to provide positive-only weights, Eq. 24 was reformulated into a bound-constrained least-squares optimization, where the $L^2$ norm of the error was reduced/minimized according to $$\min \| H_{canc} \cdot w_{canc} + G_{CH} \|_2, \tag{26}$$

and where every element in the vector $w_{canc}$ was subject to the constraint $0 \leq w_{canc} \leq 1$. This yields output weights that are positive values suitable for conversion into analog voltages. Eq. 26 was solved using a convex optimization process. This process was carried out with CVX, which is a MATLAB-based modeling package that utilizes the disciplined convex programming methodology for constructing and solving convex optimization problems. Alternatively, this equation could be computed using a number of other solvers designed to analyze bound-constrained least-squares problems, including quadratic programming and BCLS.

After these optimal real- and positive-valued weights were calculated, they were then converted to VOA values using a look-up table that contained the measured frequency responses for several of the attenuation states of the VOA. Since not every VOA state was evaluated, however, the final actual weight values were calculated using a multi-dimensional gradient-descent algorithm. The weights for each iteration k were projected in the direction of the performance surface that minimized the SI error signal at the input of the receiver. This was accomplished by computing $$w_{k+1} = w_k + \frac{\mu_0}{2^{\lfloor \frac{k-1}{p} \rfloor}} \cdot \nabla E_{\lfloor \frac{k-1}{p} + 1 \rfloor}, \tag{27}$$

where $\mu_0$ is the initial convergence coefficient and $\nabla E$ is the gradient of the error. The $\lfloor \cdot \rfloor$ symbol again represents the floor function, and was included to scale μ by half and remeasure the gradient after every p iterations, which helped improve the convergence speed. Alternatively, the gradient can be estimated for every iteration of the weights, but this is not necessary.

The total gradient of the error surface was computed by averaging the gradients of both positive and negative perturbations to the weights, such that $$\nabla E = \frac{1}{\delta} \left[ E(w_k) - \left( \frac{E(w_k + \delta) + E(w_k - \delta)}{2} \right) \right], \tag{28}$$

where δ is the constant small weight variation. This final tuning step helped reduce or eliminate any drift associated with the hardware that may have occurred between the time when the maximum-gain frequency response of each tap was measured (Eq. 17), and also accounted for the canceller's variation with temperature. By initializing the gradient-descent algorithm with the weight values calculated using the CVX convex optimization described in Eq. 26, the canceller was able to converge its weights to produce a reduced or minimized SI error at the input of the receiver. These tuning equations and methods were utilized to produce the results presented below.

Experimental Demonstration of an Example Photonic-Enabled RF Canceller

The performance of the canceller shown in FIG. 5 was evaluated in a laboratory setting using an Agilent Technologies N5222A network analyzer to implement the representative IBFD node's transmit and receive functions shown in FIG. 1. The time-domain transmission (TDT) response, or effective impulse response, was first measured to characterize the gain of a single canceller tap as well as verify the time delay extent provided by the FBGs.

Figure 7:
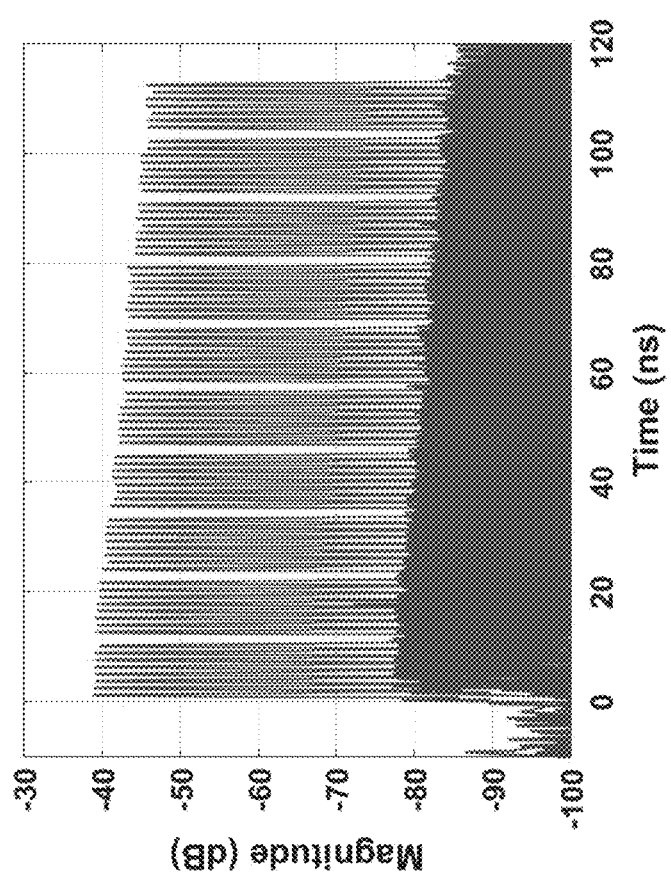
FIG. 7 is a plot showing the time-domain transmission (TDT) response, or effective impulse response, a photonic-enabled RF canceller with 80 tunable delay locations.

FIG. 7 is a plot of the composite TDT response for a single laser tuned to the 80 gratings for one FBG. The plot indicates that the maximum gain of a given canceller tap varies between approximately −40 and −45 dB, which places a bound on the insertion loss of the FBG, $l_{FBG}(f_c)$, since the other parameters were constant.

FIG. 7 also illustrates the time delay tunability of the canceller that is associated with the gratings of the FBG. The first point was shifted in time to remove the static delay of the fixed cables and corresponds to 1.3 ns on the plot. The gratings were spaced 1.3 ns apart with the 80th point providing a time delay of 115 ns with respect to the first point. This closely matches the expected delays depicted in FIG. 4.

Also evident in FIG. 7 are the manufacturing limitations that are associated with constructing a custom FBG with this large of a delay extent. The custom FBG was made by splicing together ten inscribed fibers, each of which was 1 meter long and eight gratings, to create an FBG with 80 gratings. The missing gratings between spliced-together fibers correspond to the delay of these splices and could be eliminated with by different splicing techniques or by inscribing the gratings into a single fiber. As a result, FIG. 7 shows that after every eight of the custom FBG's gratings, one point is missing, as was captured with the floor function of Eq. 5, where s=8 in this case.

FIG. 8 is a photograph of the canceller in a realistic multipath environment. This setup was used to gain an understanding of its cancellation performance capabilities for IBFD applications. A channel emulator was utilized to generate a typical wireless channel response for a node mounted on a base station tower. The channel was comprised of direct-path SI as well as strong reflections located 0.75, 1.85, and 2.65 meters from the installation location. The tuning equations described above were then employed to configure the canceller's weights for the 20 I- and Q-channel taps to effectively mitigate the perceived SI.

Figure 9:
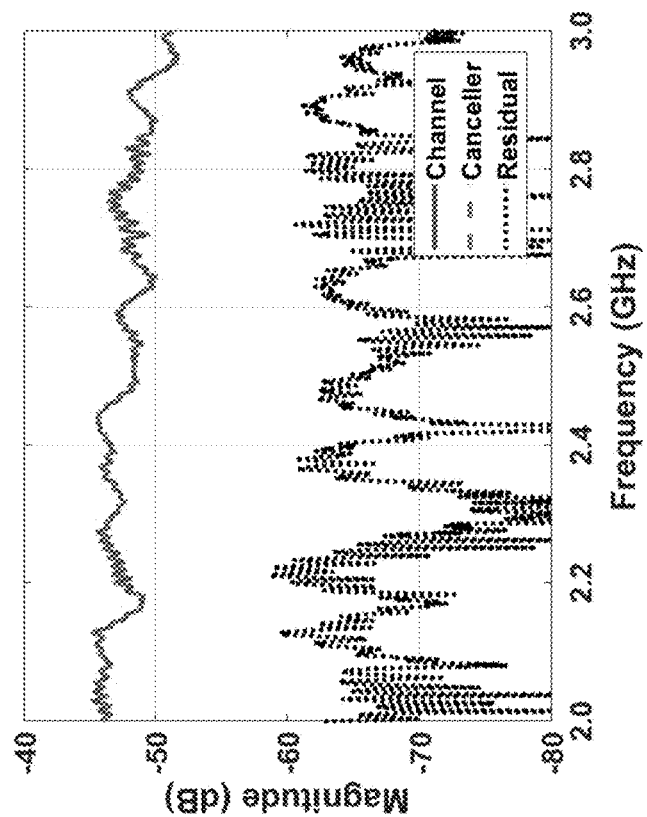
FIG. 9 is a plot of the magnitude of channel response, canceller output, and residual signal for the 1 GHz instantaneous bandwidth centered at 2.5 GHz measured using the setup of FIG. 8.

FIG. 9 illustrates the measured results for the channel response, canceller output, and residual error signal at the receiver input. In this instance, the canceller was focused on the SI between 2.0 and 3.0 GHz, and provided 20.0 dB of average cancellation over the 1-GHz band. The plot in FIG. 9 illustrates that this photonic-enabled RF canceller architecture can deliver high-performance cancellation over wide instantaneous bandwidths, which is a result of the large number of tunable taps provided by the design.

The tunable center frequency and wide operating bandwidth performance that are provided by the canceller's vector modulator construction were next investigated. FIGS. 10 and 11 show the measured cancellation performance that was achieved by tuning the canceller over 1-GHz instantaneous bandwidths and combining the results into a single graphic. In FIG. 10, the canceller was tuned four times over the 4 GHz of bandwidth from 1.0 to 5.0 GHz (1.0 to 2.0, 2.0 to 3.0, 3.0 to 4.0, and 4.0 to 5.0 GHz). The resulting cancellations for these four 1-GHz bands was 18.6, 20.0, 15.5 and 13.3 dB, respectively, with an average of 16.9 dB cancellation over the 1.0 to 5.0 GHz bandwidth when combined.

Similarly, FIG. 11 illustrates the cancellation performance when operated over five 1-GHz bands from 0.5 to 5.5 GHz (0.5 to 1.5, 1.5 to 2.5, 2.5 to 3.5, 3.5 to 4.5 and 4.5 to 5.5 GHz), and represents an 11:1 operational bandwidth. While the performance degrades slightly at the edges of this frequency range due to the insertion loss increase of various parts, the overall average cancellation measured 15.0 dB over the entire 0.5 to 5.5 GHz band. This metric was derived from the individual results of the five 1-GHz bands that produced 11.3, 21.8, 16.4, 15.8 and 9.5 dB, respectively.

Finally, the canceller was configured to tune in 500-MHz instantaneous bandwidths over 1.0 to 5.0 GHz to provide an indication of its narrower-band capability. FIG. 12 illustrates the combined channel, canceller, and residual error responses for this setup, and showed that the canceller can deliver 18.0 dB of average cancellation for these parameters. This composite performance number was derived from the eight 500-MHz bands that exist from 1.0 to 5.0 GHz, and measured 25.0, 22.8, 22.4, 16.7, 17.4, 15.1, 13.9 and 10.3 dB, respectively. If the slightly narrower cancellation numbers from 1.0 to 4.0 GHz are averaged, the result would be close to 20.0 dB cancellation over the 3.0 GHz of operational bandwidth in 500 MHz instantaneous segments.

Together, these measured cancellation results prove that this unique architecture can provide effective cancellation performance in multipath-rich environments, which are typical for most IBFD node locations. The data also showcases the canceller's ability to provide RF-domain cancellation over a wide range of operating frequencies and instantaneous bandwidths, which significantly increases its flexibility and range of deployment scenarios.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A radio-frequency (RF) canceller comprising:
   an array of tunable lasers to emit laser beams at different wavelengths;
   an optical combiner, in optical communication with the array of tunable lasers, to combine the laser beams;
   a modulator, in optical communication with the optical combiner, to modulate the laser beams with an in-phase component of an RF signal, the modulator having a first output to emit first in-phase modulated laser beams and a second output to emit second in-phase modulated laser beams, the second in-phase modulated laser beams being phase-shifted by 180° with respect to the first in-phase modulated laser beams;
   a first delay line, in optical communication with the first output of the modulator via a first circulator, to delay the first in-phase modulated laser beams by amounts corresponding to the respective wavelengths of the first in-phase modulated laser beams;
   a first photodetector, in optical communication with the first delay line via the first circulator, to detect the first in-phase modulated laser beams delayed by the first delay line;
   a second delay line, in optical communication with the second output of the modulator via a second circulator, to delay the second in-phase modulated laser beams by amounts corresponding to the respective wavelengths of the second in-phase modulated laser beams;
   a second photodetector, in optical communication with the second delay line via the second circulator, to detect the second in-phase modulated laser beams delayed by the second delay line; and
   a combiner, operably coupled to the first photodetector and the second photodetector, to combine an output of the first photodetector with an output of the second photodetector.

2. The RF canceller of claim 1, wherein the optical combiner comprises a wavelength division multiplexer.

3. The RF canceller of claim 1, further comprising:
   an array of variable optical attenuators, in optical communication with the array of tunable lasers, to attenuate the plurality of laser beams emitted by the array of tunable lasers.

4. The RF canceller of claim 1, wherein the array of tunable lasers is a first array of tunable lasers, the optical combiner is a first optical combiner, the modulator is a first modulator, and the combiner is a first combiner, and further comprising:
   a second array of tunable lasers to emit second laser beams at different wavelengths;
   a second optical combiner, in optical communication with the second array of tunable lasers, to combine the second laser beams;
   a second modulator, in optical communication with the second optical combiner, to modulate the second laser beams with a quadrature component of the RF signal, the second modulator having a first output to emit first quadrature modulated laser beams and a second output to emit second quadrature modulated laser beams, the second quadrature modulated laser beams being phase-shifted by 180° with respect to the first quadrature modulated laser beams;

a third delay line, in optical communication with the first output of the second modulator via a third circulator, to delay the first quadrature modulated laser beams by amounts corresponding to the respective wavelengths of the first quadrature modulated laser beams;

a third photodetector, in optical communication with the third delay line via the third circulator, to detect the first quadrature modulated laser beams delayed by the third delay line;

a fourth delay line, in optical communication with the second output of the second modulator via a fourth circulator, to delay the second quadrature modulated laser beams by amounts corresponding to the respective wavelengths of the second quadrature modulated laser beams;

a fourth photodetector, in optical communication with the fourth delay line via the fourth circulator, to detect the second quadrature modulated laser beams delayed by the fourth delay line; and a second combiner, operably coupled to the third photodetector and the fourth photodetector, to combine an output of the third photodetector with an output of the fourth photodetector; and a third combiner, operably coupled to the first combiner and the second combiner, to combine an output of the first combiner with an output of the second combiner.

5. A method of canceling interference from a radio-frequency (RF) signal, the method comprising:

generating laser beams at different wavelengths;

modulating the laser beams with an in-phase component of the RF signal to produce first in-phase modulated laser beams and second in-phase modulated laser beams, the second in-phase modulated laser beams being phased-shifted by 180° with respect to the first in-phase modulated laser beams;

delaying the first in-phase modulated laser beams by amounts corresponding to the respective wavelengths of the first in-phase modulated laser beams;

detecting the first in-phase modulated laser beams with a first photodetector to produce a first RF output;

delaying the second in-phase modulated laser beams by amounts corresponding to the respective wavelengths of the second in-phase modulated laser beams;

detecting the second in-phase modulated laser beams with a second photodetector to produce a second RF output; and combining the first RF output and the second RF output to at least partially cancel the interference in the RF signal.

6. The method of claim 5, further comprising, before modulating the laser beams:

attenuating the laser beams by amounts corresponding to the respective wavelengths of the laser beams.

7. The method of claim 5, wherein the laser beams are first laser beams, and further comprising:

generating second laser beams at different wavelengths;

modulating the second laser beams with a quadrature component of the RF signal to produce first quadrature modulated laser beams and second quadrature modulated laser beams, the second quadrature modulated laser beams being phased-shifted by 180° with respect to the first quadrature modulated laser beams;

delaying the first quadrature modulated laser beams by amounts corresponding to the respective wavelengths of the first quadrature modulated laser beams;

detecting the first quadrature modulated laser beams with a third photodetector to produce a third RF output;

delaying the second quadrature modulated laser beams by amounts corresponding to the respective wavelengths of the second quadrature modulated laser beams;

detecting the second quadrature modulated laser beams with a fourth photodetector to produce a fourth RF output, and combining the third RF output and the fourth RF output with the first RF output and the second RF output to at least partially cancel the interference in the RF signal.

8. A radio-frequency (RF) canceller comprising:

a first in-phase modulator to modulate an amplitude of a first copy of at least one first optical carrier modulated with a first in-phase vector of an RF signal;

a second in-phase modulator to modulate an amplitude of a second copy of the at least one first optical carrier modulated with a second in-phase vector of the RF signal, the second in-phase vector being phase-shifted by 180° with respect to the first in-phase vector;

a first quadrature modulator to modulate an amplitude of a first copy of at least one second optical carrier modulated with a first quadrature vector of the RF signal;

a second quadrature modulator to modulate an amplitude of a second copy of the at least one second optical carrier modulated with a second quadrature vector of the RF signal, the second quadrature vector being phase-shifted by 180° with respect to the first quadrature vector; and a combiner, operably coupled to the first in-phase modulator, the second in-phase modulator, the first quadrature modulator, and the second quadrature modulator, to combine to the first copy of the at least one first optical carrier, the second copy of the at least one first optical carrier, the first copy of the at least one second optical carrier, and/or the second copy of the at least one second optical carrier to cancel interference in the RF signal.

9. The RF canceller of claim 8, wherein the first in-phase modulator comprises:

a tapped delay line to delay the first copy of the at least one first optical carrier by a delay depending on a carrier wavelength of the at least one first optical carrier; and wherein the combiner comprises:

a photodetector, in optical communication with the tapped delay line, to detect the first copy of the at least one first optical carrier.

10. The RF canceller of claim 9, wherein the first copy of the at least one first optical carrier comprises first copies of a plurality of optical carriers is at different wavelengths and the tapped delay line comprises:

a fiber Bragg grating to reflect each first copy at a different propagation distance to impart the different delays.

11. The RF canceller of claim 10, wherein the tapped delay line is a first tapped delay line and the second in-phase modulator comprises a second tapped delay line to delay the second copy of the at least one first optical carrier.

12. The RF canceller of claim 11, with the first tapped delay line has taps interleaved in wavelength with taps of the second tapped delay line.

13. The RF canceller of claim 10, further comprising:

at least one light source to emit the plurality of optical carriers; and a modulator, in optical communication with the at least one light source, to modulate an amplitude of each of the plurality of optical carriers.

14. The RF canceller of claim 13, wherein the modulator comprises a variable optical attenuator.

15. A method of cancelling interference in a radio-frequency (RF) signal, the method comprising:
   modulating an amplitude of a first copy of at least one first optical carrier with a first in-phase vector of the RF signal;
   modulating an amplitude of a second copy of the at least one first optical carrier with a second in-phase vector of the RF signal, the second in-phase vector being phase-shifted by 180° with respect to the first in-phase vector;
   modulating an amplitude of a first copy of at least one second optical carrier with a first quadrature vector of the RF signal;
   modulating an amplitude of a second copy of the at least one second optical carrier with a second quadrature vector of the RF signal, the second quadrature vector being phase-shifted by 180° with respect to the first quadrature vector; and
   combining the first copy of the at least one first optical carrier, the second copy of the at least one first optical carrier, the first copy of the at least one second optical carrier, and/or the second copy of the at least one second optical carrier to cancel the interference in the RF signal.

16. The method of claim 15, wherein the at least one first optical carrier comprises a plurality of optical carriers and modulating the amplitude of the at least one first optical carrier comprises:
   modulating a first copy of each optical carrier in the plurality of optical carriers with the first in-phase vector;
   delaying the first copy of each optical carrier in the plurality of optical carriers by a different time delay; and
   detecting the first copy of each optical carrier in the plurality of optical carriers.

17. The method of claim 16, wherein each optical carrier in the plurality of optical carriers is at a different wavelength and delaying each first copy of each optical carrier comprises:
   reflecting each first copy of each optical carrier at a different propagation distance along a fiber Bragg grating.

18. The method of claim 16, wherein modulating the amplitude of the second in-phase vector comprises:
   modulating a second copy of each optical carrier in a plurality of optical carriers with the second in-phase vector;
   delaying the second copy of each optical carrier in the plurality of optical carriers by a different time delay; and
   detecting the second copy of each optical carrier in the plurality of optical carriers.

19. The method of claim 16, wherein modulating the first copy of each optical carrier and modulating the second copy of each optical carrier comprises:
   emitting the first copy from a first output of a Mach-Zehnder modulator; and
   emitting the second copy from a second output of the Mach-Zehnder modulator.

20. The method of claim 19, further comprising:
   biasing the Mach-Zehnder modulator at quadrature bias.

* * * * *